(12) United States Patent
Fink

(10) Patent No.: US 9,559,340 B2
(45) Date of Patent: Jan. 31, 2017

(54) BATTERY AND MOTOR VEHICLE COMPRISING SAID BATTERY

(75) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 545 days.

(21) Appl. No.: 14/125,065

(22) PCT Filed: Jun. 4, 2012

(86) PCT No.: PCT/EP2012/060459
§ 371 (c)(1),
(2), (4) Date: Mar. 28, 2014

(87) PCT Pub. No.: WO2012/168166
PCT Pub. Date: Dec. 13, 2012

(65) Prior Publication Data
US 2014/0199574 A1    Jul. 17, 2014

(30) Foreign Application Priority Data

Jun. 10, 2011    (DE) .................. 10 2011 077 349

(51) Int. Cl.
*H01M 2/10* (2006.01)
*H01M 2/02* (2006.01)
*B60L 11/18* (2006.01)

(52) U.S. Cl.
CPC ............ *H01M 2/0245* (2013.01); *B60L 11/18* (2013.01); *H01M 2/1077* (2013.01); *H01M 2/1083* (2013.01); *H01M 2220/20* (2013.01)

(58) Field of Classification Search
CPC  H01M 2/0245; H01M 2/1077; H01M 2/1083; H01M 2220/20; B60L 11/18
See application file for complete search history.

(56) References Cited

U.S. PATENT DOCUMENTS

2009/0239137 A1*  9/2009  Kakuchi ............. H01M 2/1016
                                                                                429/151

FOREIGN PATENT DOCUMENTS

DE    10 2010 029 872 A1    1/2011
GB         1 371 879 A    10/1974

OTHER PUBLICATIONS

International Search Report corresponding to PCT Application No. PCT/EP2012/060459, mailed Aug. 2, 2012 (German and English language document) (5 pages).

\* cited by examiner

*Primary Examiner* — Raymond Alejandro
(74) *Attorney, Agent, or Firm* — Maginot, Moore & Beck LLP

(57) ABSTRACT

A battery includes at least one battery module that has several battery cells arranged next to each other on a support plate. The battery module is arranged with the support plate on a base plate of the battery or on a base plate of a lower unit of the battery. The support plate and the base plate are fixed together by at least one fixing system that includes at least two fixing elements engaging in each other. The first fixing element is arranged on the battery module and the second fixing element is arranged on the base plate. A motor vehicle includes the battery.

15 Claims, 5 Drawing Sheets

BATTERY AND MOTOR VEHICLE COMPRISING SAID BATTERY

This application is a 35 U.S.C. §371 National Stage Application of PCT/EP2012/060459, filed on Jun. 4, 2012, which claims the benefit of priority to Serial No. DE 10 2011 077 349.5, filed on Jun. 10, 2011 in Germany, the disclosures of which are incorporated herein by reference in their entirety.

BACKGROUND

The present disclosure relates to a battery and to a motor vehicle comprising said battery, wherein the battery has at least one battery module which comprises a plurality of battery cells which are arranged on a support plate and at the same time the battery module is arranged by way of its support plate on a base plate of the battery or a base plate of a subunit of the battery, and the support plate and the base plate are connected to one another in a stationary manner by way of at least one fastening system.

It is known to design the basic structure of a battery such that in each case a plurality of battery cells are combined to form one battery module in the battery, and a plurality of battery modules are in turn arranged in a subunit. The battery is then formed from a plurality of said subunits.

In this case, said components are joined to form the assemblies usually by screw or rivet connections, as a result of which tools have to be used and an increased level of expenditure on installation is required for assembly.

SUMMARY

The disclosure provides a battery which has at least one battery module which comprises a plurality of battery cells which are arranged next to one another on a support plate. In this case, the battery module is arranged by way of its support plate on a base plate of the battery or a base plate of a subunit of the battery. The support plate and the base plate are connected to one another in a stationary manner by way of at least one fastening system. In this case, the fastening system has at least two fastening partners which latch one into the other, wherein the first fastening partner is arranged on the battery module, and the second fastening partner is arranged on the base plate. In this case, the battery is preferably a lithium-ion battery.

In this way, it is advantageously possible to assemble the battery quickly, simply and reliably by virtue of the battery module latching into the base plate. In addition, accessibility is only required from a single direction, this being advantageous for assembly.

Owing to the contour of the fastening partners, at least one of the fastening partners is forced to elastically deform when the battery module and the base plate are joined, said fastening partner springing back out of said elastic deformation during latching-in and engaging behind the other fastening partner. As a result, advantageously, no additional tool is required for mounting the battery module on the base plate.

Furthermore, a clear position of the battery module on the base plate of the battery or the base plate of a subunit of the battery is advantageously prespecified by way of the fastening system. As a result, the assembly process for the battery according to the disclosure can be easily incorporated into an automated process.

In this application, the first fastening partner is defined in that it is arranged on the battery module, and the second fastening partner is defined in that it is arranged on the base plate.

In a preferred refinement of the disclosure, it is provided that at least one interlocking connection in a direction perpendicular to the base plate is established by the two fastening partners.

In this way, the battery module is prevented from lifting off from the base plate immediately after the battery module is mounted on the base plate.

In a further preferred refinement of the disclosure, it is provided that the first fastening partner is arranged on the support plate of the battery module.

Since the support plate of the battery module provides a relatively large surface area and is mounted on the base plate of the battery or on the base plate of a subunit of the battery, a variety of positioning options are possible for the arrangement of the first fastening partner on the support plate. This advantageously provides a relatively large amount of room for manoeuvre in respect of design when packaging the battery.

As an alternative to the arrangement of the first fastening partner on the support plate of the battery module, it is provided that the first fastening partner is arranged on a pressure plate of the battery module, said pressure plate being arranged next to an outer one of the battery cells. In this case, a pressure plate is preferably arranged in front of the first battery cell and behind the last battery cell of the battery module in each case.

Given this configuration, the fastening points are arranged on the outer edges of the base surface of the battery module. Therefore, a distance between the fastening systems which is as large as possible and therefore more efficient fastening can advantageously be achieved.

In a further preferred refinement of the disclosure, it is provided that the second fastening partner is formed by a cutout in the base plate and an area, which borders the cutout, of the base plate. In this case, the first fastening partner is preferably a spring arm which projects into the cutout and engages behind that area of the base plate which borders the cutout.

A cutout advantageously constitutes the most simple and most cost-effective refinement with which an undercut is generated, said undercut allowing the other fastening partner to latch-in. In this case, the cutout is preferably a hole, in particular a blind hole.

In this case, the cutout is preferably arranged in the base plate, beneath the battery module.

This advantageously has the result that no additional space is required within the battery for the fastening system.

In a preferred refinement, it is provided that the first fastening partner is a projection, and the second fastening partner is a spring arm which engages behind the projection.

In this way, a second fastening partner is created, said second fastening partner projecting out of the basic shape of the support plate. The core of the support plate remains untouched when the fastening system is designed in this way. Therefore, it is advantageously possible to conduct systems, lines, in particular cooling lines or the like, through the support plate.

Therefore, in a further preferred refinement of the disclosure, it is provided that the base plate dissipates heat, that is to say is a cooling plate.

Given the configuration of the base plate as a cooling plate, it is advantageously easier to control the temperature of the battery module.

In a further preferred refinement of the disclosure, it is provided that an intermediate layer which applies a pretensioning force between the battery module and the base plate is arranged between the battery module and the base plate.

In this way, the fastening system is advantageously better secured against the fastening partners becoming detached from one another.

In a further preferred refinement of the disclosure, it is provided that the first fastening partner is integrally formed with the support plate or the pressure plate and/or the second fastening partner is integrally formed with the base plate.

In this way, the battery according to the disclosure is advantageously constructed from fewer individual parts.

The disclosure further provides a motor vehicle comprising the battery according to the disclosure in the abovementioned refinements, wherein the battery is connected to a drive system of the motor vehicle. The advantages of the battery according to the disclosure as a component are therefore also of benefit to the motor vehicle as an assembly.

Advantageous developments of the disclosure are specified in the dependent claims and discussed in the description.

In this application, the term "battery" also includes battery systems, accumulators, accumulator batteries, accumulator systems, in particular lithium-ion systems or lithium-ion polymer systems.

BRIEF DESCRIPTION OF THE DRAWINGS

The present disclosure will be explained in greater detail with reference to the drawings and the following description. In the drawings.

DETAILED DESCRIPTION

Figure 1:
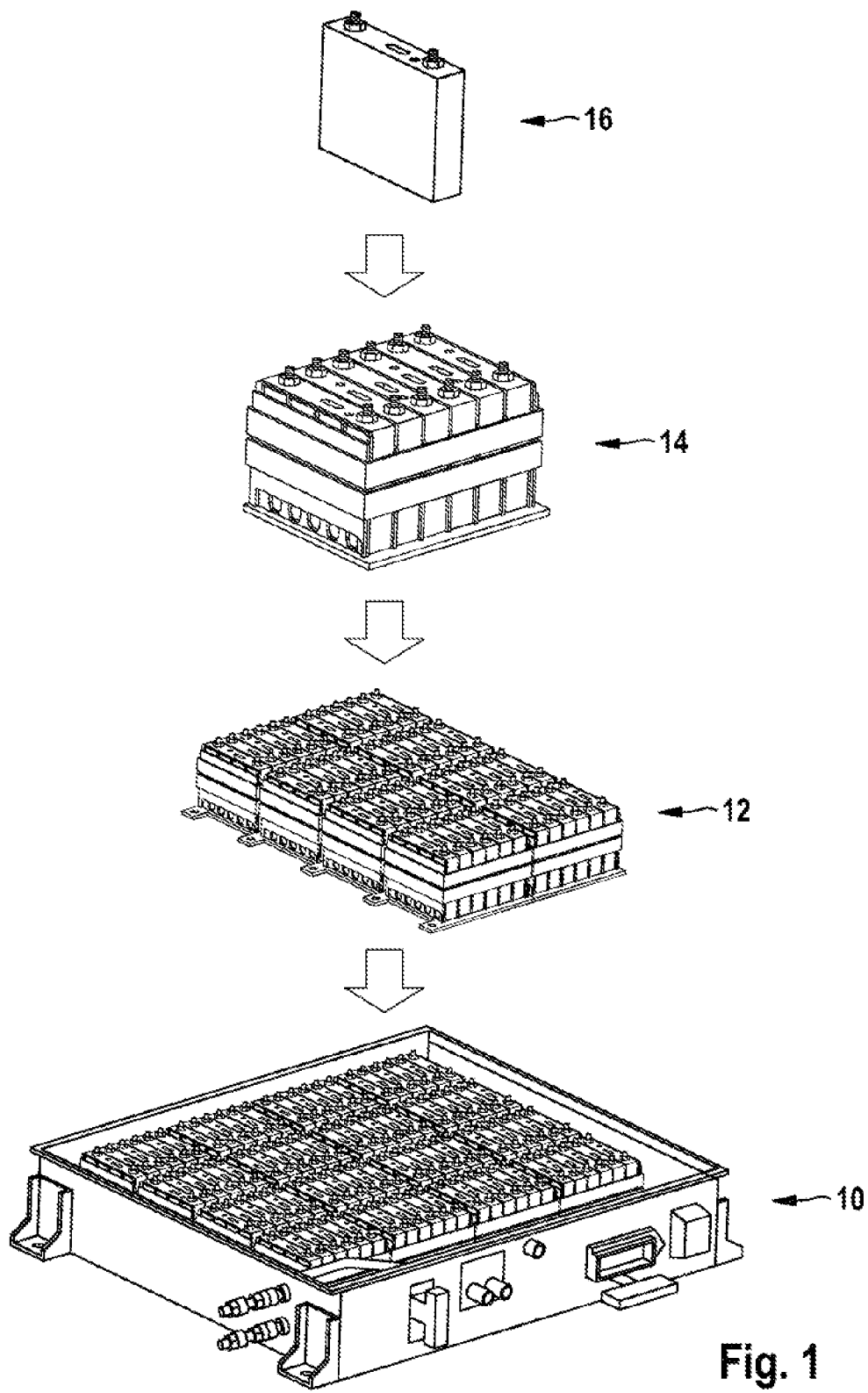
FIG. 1 shows the basic structure of a battery according to the prior art.

FIG. 1 shows, by way of example and in a non-limiting manner, the basic structure of a battery 10 according to the prior art. In principle, the battery 10 according to the disclosure has the same basic structure. A plurality of battery cells 16 are in each case combined to form one battery module 14 in the battery 10. A plurality of battery modules 14 are arranged in a subunit 12 in each case. And a plurality of subunits 12 form the battery 10 in this case.

It is also possible for the battery 10 to comprise only a single subunit 12 or only a single battery module 14.

Figure 2:
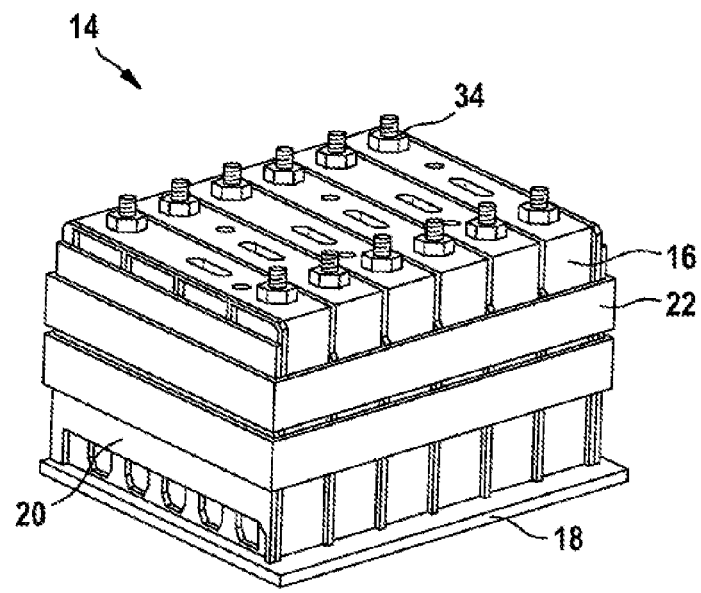
FIG. 2 shows a battery module according to the prior art.

FIG. 2 shows, by way of example and in a non-limiting manner, a battery module 14 according to the prior art. The battery module 14 of the battery 10 according to the disclosure is based on this design. In the depicted variant, the battery module 14 has six battery cells 16. There may also be more or less than six battery cells 16 per battery module 14. The number of battery cells 16 depends on the required power and energy parameters of the battery module 14 and the power and energy parameters of the individual battery cells 16.

The battery cells 16 each have a substantially prismatic main body, preferably a substantially cuboidal main body, and are arranged next to one another jointly on a support plate 18. As a result, the battery module 14 likewise has a substantially prismatic basic shape, preferably a substantially cuboidal basic shape.

In this case, the battery cells 16 are preferably mounted on the support plate 18 by way of their bottom face, that is to say the face of the body which is opposite the face of the body on which the terminals 34 are located.

In order to hold the individual battery cells 16 together, said battery cells are surrounded by at least one tensioning strap 22. In order that the outer battery cells 16, that is to say those which adjoin a further battery cell 16 only on one side, are not subject to excessive loading in the process, pressure plates 20 are preferably provided on the end faces of the battery cell 14. The pressure plates 20 distribute forces which are exerted by the tensioning strap 22 over a large area of the outer battery cells 16.

Heat-conducting metal sheets are optionally arranged between the individual battery cells 16 in order to better thermally interlink the individual battery cells 16.

Figure 3:
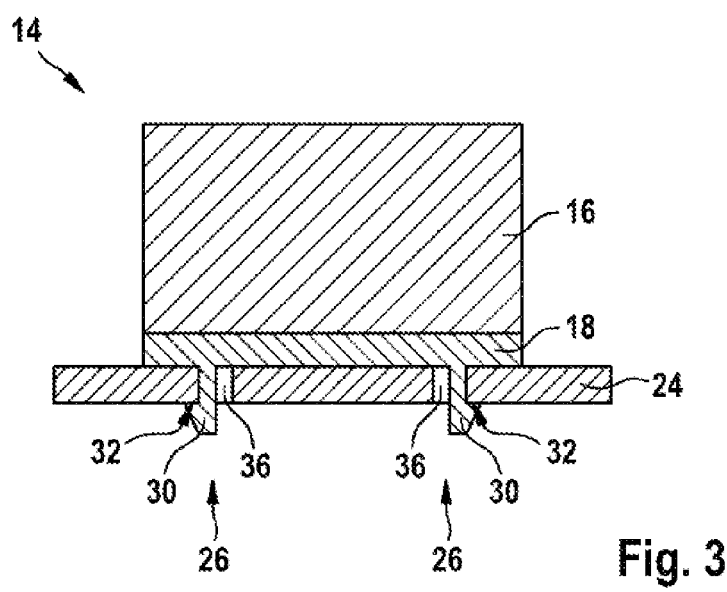
FIG. 3 shows a schematic diagram of an embodiment of a battery module of a battery according to the disclosure.

FIG. 3 shows, by way of example and in a non-limiting manner, a schematic diagram of one embodiment of a battery module 14 of the battery 10 according to the disclosure. Said figure shows a cross section parallel to an end face of the battery module 14.

Said figure shows the battery module 14 comprising a battery cell 16 and a support plate 18 on a base plate 24. In this case, the base plate 24 can be part of a subunit 12 of the battery 10 or part of the battery 10 itself.

In a refinement according to the disclosure, the battery module 14 and the base plate 24 have fastening systems 26. Two fastening systems 26 which are arranged in a mirror-inverted manner in relation to one another are depicted.

According to the disclosure, at least one fastening system 26 is provided. According to the disclosure, the arrangement of further fastening systems 26 is provided depending on the size and mass of the battery module 14. Said fastening systems can also be arranged offset and/or at an angle in relation to one another. According to the disclosure, it is also feasible for different embodiments of fastening systems 26 to be present at the same time.

The fastening systems 26 shown in FIG. 3 each have two fastening partners, a first fastening partner 30 and a second fastening partner 32. In this case, the first fastening partner 30 is defined in this application in that it is arranged on the battery module 14, and the second fastening partner 32 is defined in that it is arranged on the base plate 24.

The design of the depicted fastening partners 30 and 32 is merely exemplary. In FIG. 3, the first fastening partners 30 are each formed by a spring arm with an undercut. And the second fastening partners 32 are formed by a respective cutout 36 and an area, which adjoins the cutout, of the base plate 24 in this case.

The spring arm has a substantially elongate design which can be elastically deformed by bending. At its free end, the spring arm is provided with a beveled area by means of which this elastic bending is caused when the contour of the second fastening partner 32 is moved over. Behind the bevels, the spring arm has an undercut. When the fastening partners 30 and 32 latch-in, said undercut, together with an area of the second fastening partner 32, establishes an interlocking connection counter to the mounting direction. This prevents the battery module 14 from lifting off from the base plate 24.

When the battery module 14 is joined to the base plate 24, the spring arms are pushed away from the contour of the base plate 24, that is to say the cutouts 36, and spring back into their normal, undeformed position after passing the cutouts 36. As a result, the undercut of the spring arms engages behind the base plate 24. The respective spring arm is additionally blocked by the wall of the cutout 36 at least in a transverse direction in relation to the mounting direction. The fastening systems 26 are preferably oriented such that the various fastening systems 26 block the first fastening partners 30 in different transverse directions.

In a modification to the embodiment which is shown in FIG. 3, the cutouts 36 can also be arranged at the edge of the base plate 24. In addition, a design of the cutouts 36 as blind holes is also possible, said blind holes having a depth which is less than the thickness of the base plate 24. Therefore, the cutout 36 does not extend as far as the bottom face of the base plate 24. The blind hole then itself has an undercut in the interior, it being possible for the first fastening partner 30 to latch into said undercut.

Depending on the embodiment of the cutout 36, the height of the first fastening partner 30 is such that the battery module 14 rests on the base plate 24 with a defined force. To this end, an intermediate layer 28 may be arranged between the battery module 14 and the base plate 24.

Figure 4:
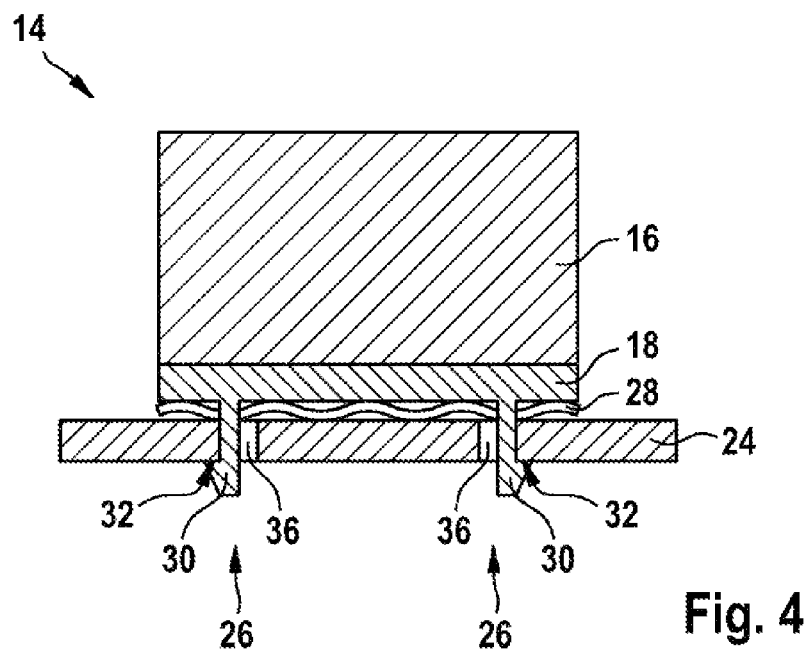
FIG. 4 shows a schematic diagram of a further embodiment of the battery module of the battery according to the disclosure.

FIG. 4 shows, by way of example and in a non-limiting manner, a schematic diagram of a further embodiment of the battery module 14 of the battery 10 according to the disclosure. Said figure shows a cross section parallel to an end face of the battery module 14.

In addition to the refinement shown in FIG. 3, the variant of FIG. 4 has an intermediate layer 28 which is arranged between the support plate 18 and the base plate 24. According to the disclosure, the intermediate layer 28 is optionally provided.

The intermediate layer 28 exerts a defined pretensioning force on the battery module 14 and the base plate 24 in the mounted state. In this case, the intermediate layer 28 has elastic deformation properties. This is indicated by the undulating illustration in FIG. 4. The actual design of the intermediate layer 28 can differ from that which is illustrated.

Figure 5:
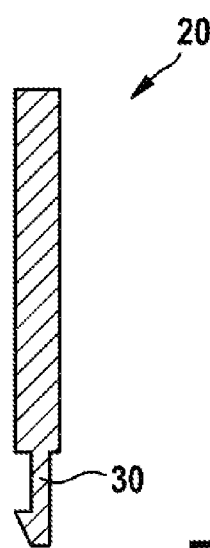
FIG. 5 shows a cross section through a pressure plate of a battery module of a battery according to the disclosure.

FIG. 5 shows, by way of example and in a non-limiting manner, a cross section through a pressure plate 20 of a battery according to the disclosure. The pressure plate 20 has an integrated first fastening partner 30. The number and the arrangement of fastening partners 30 can vary in this case; said number of fastening partners 30 must not correspond to the number of second fastening partners 32 of the base plate 24 (not depicted here) so that several options in respect of the location of a means for fixing the battery module 14 on the base plate 24 are provided.

Figure 9:
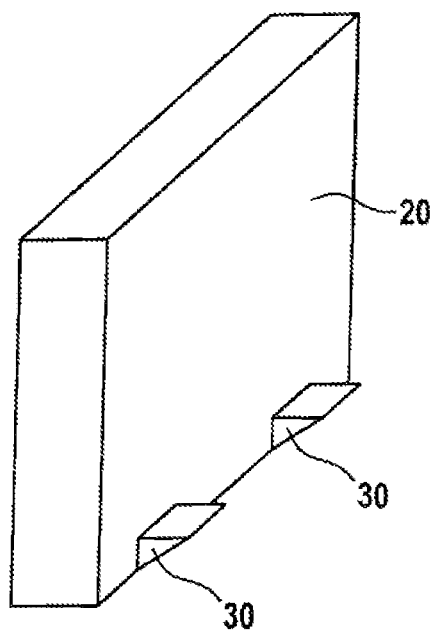
FIG. 9 shows a pressure plate with fastening elements.

In FIG. 5, the first fastening partner 30 is a spring arm by way of example. In FIG. 9, the two first fastening partners 30 of the pressure plate 20 are designed as projections by way of example. According to the disclosure, the pressure plate 20 and the first fastening partner 30 are preferably of integral design. In accordance with the shape of the first fastening partners 30, the second fastening partners 32 are designed so as to correspond to the first fastening partners 30, so that latching-in in a defined position is possible.

Figure 6:
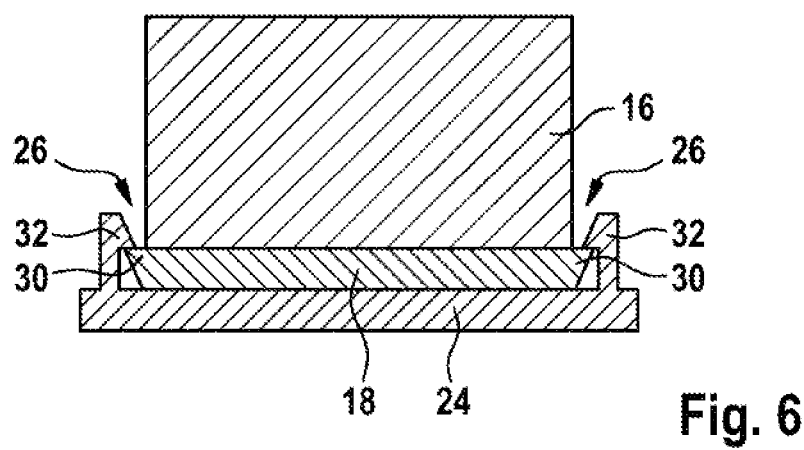
FIG. 6 shows a schematic diagram of a further embodiment of the battery module of the battery according to the disclosure.

Therefore, FIG. 6 shows, by way of example and in a non-limiting manner, a schematic diagram of an embodiment of the battery module 14 of a battery 10 according to the disclosure in which the first fastening means 30 are likewise formed as projections. In this case, they are formed on the support plate 18 of the battery module 14, in contrast to FIG. 9. Said FIG. 6 shows a cross section parallel to an end face of the battery module 14.

The battery module 14 comprising a battery cell 16 and a support plate 18 on a base plate 24 is shown in said FIG. 6. In this case, the base plate 24 can be part of a subunit 12 of the battery 10 or part of the battery 10 itself.

In a refinement according to the disclosure, the battery module 14 and the base plate 24 have fastening systems 26. Two fastening systems 26 which are arranged in a mirror-inverted manner in relation to one another are depicted.

The design of the fastening partners 30 and 32 which are illustrated in FIG. 6 is merely exemplary. In FIG. 6, the first fastening partners 30 are each formed by a projection from the support plate 18. The projections each have a rising slope and an undercut. In this case, the second fastening partners 32 are each formed by a spring arm.

When the battery module 14 is joined to the base plate 24, the spring arms are pushed away from the contour of the support plate 18, that is to say the rising slopes, and spring back into their normal, undeformed position after passing the rising slopes. As a result, the undercut of the spring arms in each case engages behind the support plate 18. The undercut of the spring arm and the undercut of the projection from the support plate 18 therefore form an interlocking connection in each case.

Figure 7:
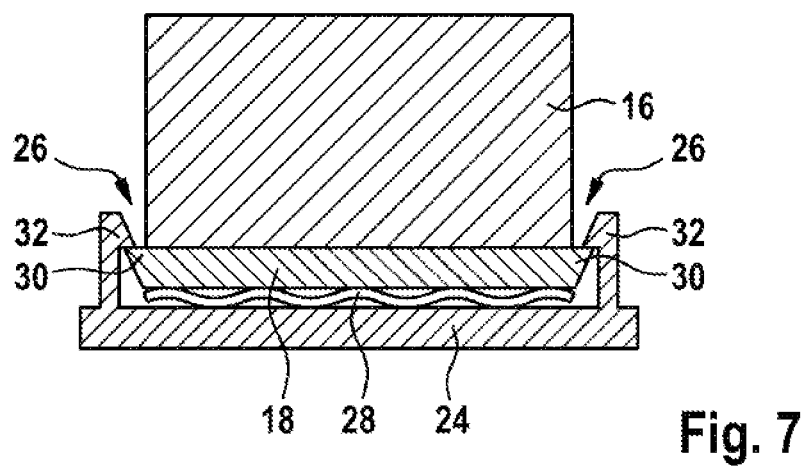
FIG. 7 shows a schematic diagram of a further embodiment of the battery module of the battery according to the disclosure.

FIG. 7 shows, by way of example and in a non-limiting manner, a schematic diagram of a further embodiment of the battery module 14 of the battery 10 according to the disclosure. Said figure shows a cross section parallel to an end face of the battery module 14.

In addition to the refinement which is shown in FIG. 6, the variant of FIG. 7 has an intermediate layer 28 which is arranged between the support plate 18 and the base plate 24, in line with FIG. 4.

Figure 8:
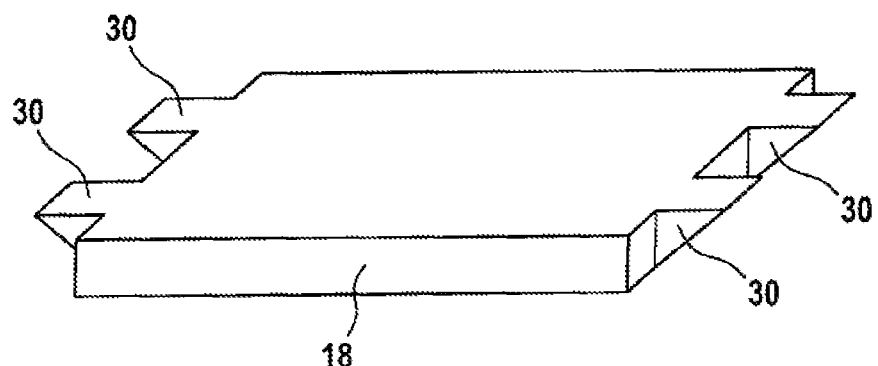
FIG. 8 shows a support plate with fastening elements.

FIG. 8 shows, by way of example and in a non-limiting manner, a support plate 18 of a battery 10 according to the disclosure. In this case, the support plate 18 has first fastening partners 30 which are designed as projections. According to the disclosure, the projections are preferably integrally formed with the support plate 18.

The invention claimed is:

1. A battery, comprising:
   a support plate;
   a base plate; and
   a battery module, including:
      a plurality of battery cells arranged next to one another on the support plate; and
      a pressure plate arranged on an end face of only one battery cell of the plurality of battery cells,
   wherein the battery module is arranged by way of the support plate on the base plate,
   wherein the support plate and the base plate are connected to one another in a stationary manner by way of at least one fastening system, and
   wherein the fastening system has a first fastening partner and a second fastening partner that latch into one another, the first fastening partner being arranged on the pressure plate of the battery module, and the second fastening partner being arranged on the base plate.

2. The battery as claimed in claim 1, wherein at least one interlocking connection in a direction perpendicular to the base plate is established by the first and second fastening partners.

3. The battery as claimed in claim 1, wherein the second fastening partner is formed by a cutout in the base plate and an area of the base plate that borders the cutout.

4. The battery as claimed in claim 3, wherein the first fastening partner is a spring arm that projects into the cutout and engages behind that area of the base plate that borders the cutout.

5. The battery as claimed in claim 3, wherein the cutout is arranged in the base plate beneath the battery module.

6. The battery as claimed in claim 1, wherein the first fastening partner is a projection, and the second fastening partner is a spring arm that engages behind the projection.

7. The battery as claimed in claim 1, further comprising an intermediate layer arranged between the battery module and the base plate, the intermediate layer being configured to apply a pretensioning force between the battery module and the base plate.

8. The battery as claimed in claim 2, wherein one or more of (i) the first fastening partner is integrally formed with the pressure plate and (ii) the second fastening partner is integrally formed with the base plate.

9. A motor vehicle, comprising:
a drive system; and
a battery connected to the drive system, the battery including:
  a support plate;
  a base plate; and
  a battery module, including:
    a plurality of battery cells arranged next to one another on the support plate; and
    a pressure plate arranged on an end face of only one battery cell of the plurality of battery cells,
wherein the battery module is arranged by way of the support plate on the base plate,
wherein the support plate and the base plate are connected to one another in a stationary manner by way of at least one fastening system, and
wherein the fastening system has a first fastening partner and a second fastening partner that latch into one another, the first fastening partner being arranged on the pressure plate of the battery module, and the second fastening partner being arranged on the base plate.

10. A battery, comprising:
a support plate;
a base plate; and
a battery module including a plurality of battery cells arranged next to one another on the support plate,
wherein the battery module is arranged on the base plate by way of the support plate,
wherein the support plate and the base plate are connected to one another in a stationary manner by way of at least one fastening system, and
wherein the fastening system includes a first fastening partner and a second fastening partner that latch into one another,
wherein the second fastening partner is formed by a cutout in the base plate and an area of the base plate that borders the cutout, and
wherein the first fastening partner is a spring arm that projects into the cutout and engages behind that area of the base plate that borders the cutout.

11. The battery as claimed in claim 10, wherein at least one interlocking connection in a direction perpendicular to the base plate is established by the first and second fastening partners.

12. The battery as claimed in claim 10, wherein the first fastening partner is arranged on the support plate of the battery module.

13. The battery as claimed in claim 10, wherein the first fastening partner is arranged on a pressure plate of the battery module, said pressure plate being arranged next to an outer one of the battery cells.

14. The battery as claimed in claim 10, wherein the cutout is arranged in the base plate beneath the battery module.

15. The battery as claimed in claim 10, further comprising an intermediate layer arranged between the battery module and the base plate, the intermediate layer being configured to apply a pretensioning force between the battery module and the base plate.

* * * * *